US011096069B2

(12) United States Patent
Dang et al.

(10) Patent No.: US 11,096,069 B2
(45) Date of Patent: Aug. 17, 2021

(54) APPARATUS AND METHOD FOR HYBRID MULTIPLE ACCESS WIRELESS COMMUNICATION SYSTEM

(71) Applicant: SONY CORPORATION, Tokyo (JP)

(72) Inventors: Jian Dang, Jiangsu (CN); Jianqing Dou, Jiangsu (CN); Yu Shi, Jiangsu (CN); Zaichen Zhang, Jiangsu (CN); Liang Wu, Jiangsu (CN); Pen-shun Lu, Beijing (CN)

(73) Assignee: SONY CORPORATION, Tokyo (JP)

( * ) Notice: Subject to any disclaimer, the term of this patent is extended or adjusted under 35 U.S.C. 154(b) by 62 days.

(21) Appl. No.: 16/092,794

(22) PCT Filed: Apr. 6, 2017

(86) PCT No.: PCT/CN2017/079524
§ 371 (c)(1),
(2) Date: Oct. 11, 2018

(87) PCT Pub. No.: WO2017/177854
PCT Pub. Date: Oct. 19, 2017

(65) Prior Publication Data
US 2019/0141545 A1    May 9, 2019

(30) Foreign Application Priority Data
Apr. 15, 2016   (CN) .......................... 201610237049.8

(51) Int. Cl.
*H04W 24/02* (2009.01)
*H04L 5/00* (2006.01)
(Continued)

(52) U.S. Cl.
CPC ........... *H04W 24/02* (2013.01); *H04L 5/0037* (2013.01); *H04L 5/0041* (2013.01);
(Continued)

(58) Field of Classification Search
CPC ..... H04W 24/00; H04W 24/02; H04W 24/04; H04W 24/10; H04W 72/04; H04W 72/08;
(Continued)

(56) References Cited

U.S. PATENT DOCUMENTS

2008/0102822 A1    5/2008  Feng et al.
2010/0238883 A1*   9/2010  Borran .................. H04W 16/10
                                                 370/329
(Continued)

FOREIGN PATENT DOCUMENTS

CN          1885748 A      12/2006
CN          1909537 A       2/2007
(Continued)

OTHER PUBLICATIONS

English-language translation of International Search Report and Written Opinion for International Application No. PCT/CN2017/079524 dated Jun. 29, 2017.

*Primary Examiner* — Peter Chen
(74) *Attorney, Agent, or Firm* — Xsensus LLP

(57) ABSTRACT

Provided are an apparatus and method for a hybrid multiple access wireless communication system. The apparatus comprises: a parameter acquisition unit configured to acquire a relevant parameter of a hybrid multiple access wireless communication system; and a sub-carrier allocation unit configured to use the relevant parameter to allocate sub-carriers to each user equipment with the purpose of optimizing overall communication quality of the hybrid multiple access wireless communication system.

16 Claims, 9 Drawing Sheets

(51) Int. Cl.
- *H04W 72/08* (2009.01)
- *H04L 27/26* (2006.01)
- *H04L 25/02* (2006.01)
- *H04W 72/04* (2009.01)

(52) U.S. Cl.
CPC ........ *H04L 5/0064* (2013.01); *H04L 25/0204* (2013.01); *H04L 27/2601* (2013.01); *H04L 27/264* (2013.01); *H04W 72/08* (2013.01); *H04W 72/0453* (2013.01); *H04W 72/0486* (2013.01)

(58) Field of Classification Search
CPC ............. H04W 72/082; H04W 72/085; H04W 72/042; H04W 72/044; H04W 72/0413; H04W 72/0453; H04W 72/0486; H04L 5/0007; H04L 5/006; H04L 5/0032; H04L 5/0037; H04L 5/0041; H04L 5/0064; H04L 25/0204; H04L 27/2601; H04L 27/264; H04L 65/80

See application file for complete search history.

(56) References Cited

U.S. PATENT DOCUMENTS

| | | | |
|---|---|---|---|
| 2015/0282148 A1* | 10/2015 | Le | H04W 72/0406 370/329 |
| 2015/0351098 A1* | 12/2015 | Schellmann | H04L 5/0064 370/329 |
| 2017/0324571 A1* | 11/2017 | Bontu | H04W 76/27 |

FOREIGN PATENT DOCUMENTS

| | | |
|---|---|---|
| CN | 101483874 A | 7/2009 |
| CN | 102164370 A | 8/2011 |
| CN | 102857874 A | 1/2013 |
| CN | 104104639 A | 10/2014 |

\* cited by examiner

APPARATUS AND METHOD FOR HYBRID MULTIPLE ACCESS WIRELESS COMMUNICATION SYSTEM

The present application claims priority to Chinese Patent Application No. 201610237049.8, titled "APPARATUS AND METHOD FOR HYBRID MULTIPLE ACCESS WIRELESS COMMUNICATION SYSTEM", filed on Apr. 15, 2016 with the State Intellectual Property Office of People's Republic of China, which is incorporated herein by reference in its entirety.

FIELD OF THE INVENTION

The present disclosure relates to the technical field of wireless communications, particularly to hybrid multiple access technology, and more particularly to an apparatus and a method for a hybrid multiple access wireless communication system.

BACKGROUND OF THE INVENTION

Hybrid multiple access (HMA) technology has a wide application prospect. As compared with other onefold multiple access technology such as frequency division multiple access (FDMA), orthogonal frequency division multiple access (OFDMA), code division multiple access (CDMA) and interleave division multiple access (IDMA), the HMA technology has a layered structure, and combines advantages of technologies used in all layers. Therefore, it is expected to apply the HMA technology to the next-generation wireless communication system due to advantages of the HMA technology such as high quality of service and high anti-interference ability.

In the HMA system, a problem of sub-carrier allocation for each of user equipment becomes more complicated due to the influence brought by the multiple-layer structure.

SUMMARY OF THE INVENTION

In the following, an overview of the present invention is given simply to provide basic understanding to some aspects of the present invention. It should be understood that this overview is not an exhaustive overview of the present invention. It is not intended to determine a critical part or an important part of the present invention, nor to limit the scope of the present invention. An object of the overview is only to give some concepts in a simplified manner, which serves as a preface of a more detailed description described later.

According to an aspect of the present disclosure, an apparatus for a hybrid multiple access wireless communication system is provided, which includes: a parameter acquiring unit, configured to acquire a parameter related to the hybrid multiple access wireless communication system; and a sub-carrier allocating unit, configured to allocate sub-carriers for each of user equipment using the related parameter with a target of optimizing an overall communication quality of the hybrid multiple access wireless communication system.

According to another aspect of the present disclosure, an apparatus for a hybrid multiple access wireless communication system is further provided, which includes: a receiving unit, configured to receive information of sub-carrier allocation from a base station; and a sub-carrier determining unit, configured to determine, based on the received information, sub-carriers to be used.

According to another aspect of the present disclosure, a method for a hybrid multiple access wireless communication system is further provided, which includes: acquiring a parameter related to the hybrid multiple access wireless communication system; and allocating sub-carriers for each of user equipment using the related parameter with a target of optimizing an overall communication quality of the hybrid multiple access wireless communication system.

According to another aspect of the present disclosure, a method for a hybrid multiple access wireless communication system is further provided, which includes: receiving information of sub-carrier allocation from a base station; and determining, based on the received information, sub-carriers to be used.

With the apparatus and the method for a hybrid multiple access wireless communication system according to the embodiments of the present disclosure, a reasonable allocation of sub-carriers can be achieved, and the system performance and the spectrum utilization efficiency are improved.

According to other aspects of the present disclosure, there are further provided computer program codes and computer program products for implementing a method for a hybrid multiple access wireless communication system, and a computer readable storage medium on which the computer program codes for implementing the methods is recorded.

These and other advantages of the present disclosure will be more apparent by illustrating in detail a preferred embodiment of the present invention in conjunction with accompanying drawings below.

BRIEF DESCRIPTION OF THE DRAWINGS

To further set forth the above and other advantages and features of the present invention, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present invention and should not be construed as a limitation to the scope of the invention. In the accompanying drawings.

DETAILED DESCRIPTION OF EMBODIMENTS

Exemplary embodiments of the present invention will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present invention due to unnecessary details, only a device structure and/or processing steps closely related to the solution according to the present invention are illustrated in the accompanying drawing, and other details having little relationship to the present invention are omitted.

First Embodiment

In an existing single-layer multiple access system such as OFDMA, each sub-carrier may only be used by one user equipment at the same time to ensure a normal operation of the system. On the other hand, in the HMA system, taking a dual-layer structure in which a multi-carrier technology and a multiple access technology are combined as an example, each user randomly uses an individual sub-carrier or all sub-carriers. However, for the scheme in which all the sub-carriers are used (such as the existing OFDM-IDMA communication system), excessive spectrum resources are consumed, and for the scheme in which a sub-carrier is used randomly, a characteristic of a system combining the multi-carrier technology and the multiple-access technology is not considered, and thus the system performance is poor.

Figure 1:
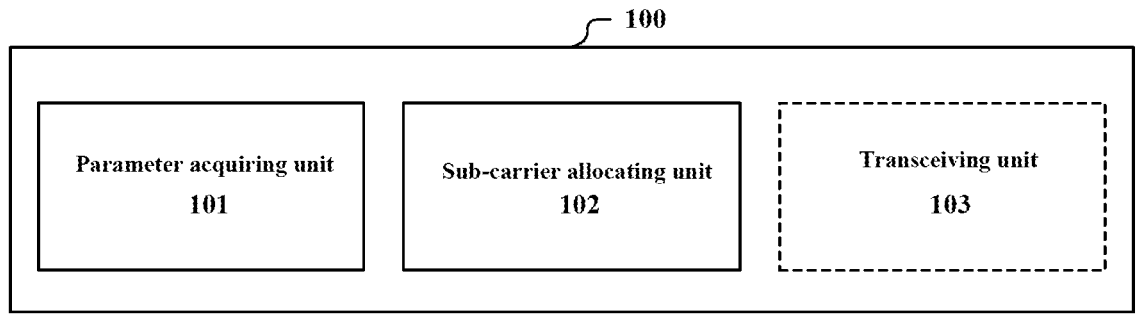
FIG. 1 is a block diagram of a structure of an apparatus for a hybrid multiple access (HMA) wireless communication system according to an embodiment of the present disclosure.

FIG. 1 is a block diagram of a structure of an apparatus 100 for a HMA wireless communication system according to an embodiment of the present disclosure. The apparatus 100 includes: a parameter acquiring unit 101, configured to acquire a parameter related to the HMA wireless communication system; and a sub-carrier allocating unit 102, configured to allocate sub-carriers for each of user equipment using the related parameter with a target of optimizing an overall communication quality of the hybrid multiple access wireless communication system.

Figure 2:
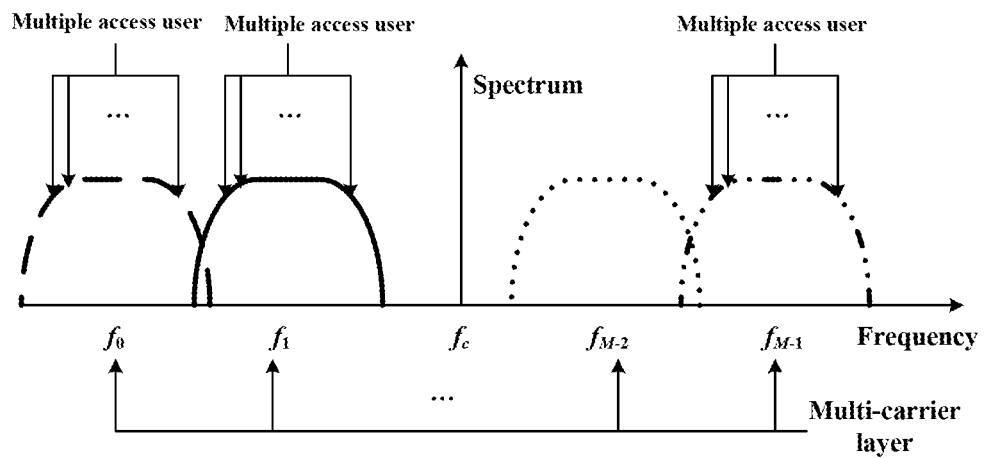
FIG. 2 is a schematic spectrum diagram of a HMA wireless communication system.

As mentioned above, the problem of the sub-carrier allocation in the HMA system is complicated due to the influence of the layered structure in the HMA wireless communication system. In an example, the HMA wireless communication system is a layered system combining the multi-carrier technology and the multiple access technology. FIG. 2 is a schematic spectrum diagram of a HMA system. It can be seen that, due to the addition of the multiple access layers, one sub-carrier may be allocated to multiple user equipment at the same time without causing confusion among transmission data. As an example, the HMA wireless communication system may be a filter bank multiple carrier-interleave division multiple access (FBMC-IDMA) communication system.

The apparatus 100 according to the present disclosure may be located, for example, on a management side of the network such as a base station, or may exist as a separate device. The base station may be implemented as any type of evolved Node B (eNB). Instead, the base station may be implemented as any other type of base station such as a NodeB and a base transceiver station (BTS). The base station may include: a main body (which is also referred to as a base station device) configured to control wireless communication; and one or more remote wireless heads (RRH) arranged in positions different from that of the main body. In addition, various types of terminal devices may operate as base stations by performing base station functions temporarily or semi-permanently. However, this is merely exemplary and the apparatus 100 may be applied to any wireless transmitter performing hybrid multiple access communication. The apparatus 100 may optimize the overall communication quality of the entire wireless communication system by performing reasonable sub-carrier allocation.

In an example, the overall communication quality may be characterized by at least one of the following: a sum signal-to-noise ratio (sum SNR) of the user equipment, channel capacity and an achievable rate. For example, in a case of adopting the sum signal-to-noise ratio, the above optimization may be performed by maximizing the sum signal-to-noise ratio of all of the user equipment. On the other hand, in a case of adopting the channel capacity or the achievable rate, the above optimization may be performed by maximizing the channel capacity or the achievable rate.

In addition, the sub-carrier allocating unit 102 may be configured to perform the sub-carrier allocation further based on a condition that each of the sub-carriers carries a uniform number of user equipment. This can lead to a more balanced load on each of the sub-carriers, improve spectrum utilization efficiency and improve the system performance.

The parameter acquiring unit 101 is configured to acquire a parameter related to the HMA system to be used in the sub-carrier allocation. For example, the related parameter include at least a part of the following: the number $K$ of active user equipment, the number $M$ of all the sub-carriers, the number $D$ of sub-carriers to be allocated to each of the user equipment, a channel vector $\tilde{h}_k$ corresponding to each of the user equipment k, a coefficient vector $f_m$ of the m-th sub-carrier, a power $p_{k,m}$ of the k-th user equipment on the m-th sub-carrier, and a noise power $\sigma_k^2$ of the k-th user equipment.

The sub-carrier allocating unit 102 may be configured to determine, based on the parameters, the number of sub-carriers to be allocated to the user equipment and which sub-carriers are to be allocated. For example, the sub-carrier allocating unit 102 may be configured to determine, based on a channel vector $\tilde{h}_k$, a quality of service (QoS) requirement of the user equipment and the number of the active user equipment, the number of the sub-carriers to be allocated to the user equipment. For example, in a case of a better channel condition, higher QoS and a smaller number of active user equipment, a larger number of sub-carriers are to be allocated to the user equipment. The channel vector is obtained, for example, by channel estimation.

In addition, the number of sub-carriers to be allocated to the user equipment may be pre-determined, and the sub-carrier allocating unit 102 determines only which sub-carriers are to be allocated.

In a particular example, the sub-carrier allocating unit 102 is configured to optimize the sub-carrier allocation by taking a condition whether the k-th user equipment uses the m-th sub-carrier as an optimization variable, with an optimization target of maximizing the sum signal-to-noise ratio of all of the user equipment.

In addition, in a case of performing the above optimization, the following limitations may be included: each of the user equipment uses D sub-carriers, and each of the sub-carriers carries a uniform number of user equipment.

In the example, the sum SNR is composed of the SNRs of all of the user equipment. The SNR of each of the user equipment is determined by channel state information (CSI) of the user equipment and the selected sub-carriers. The CSI is, for example, a channel vector obtained by a channel estimation algorithm, and a corresponding sum signal-to-noise ratio may be expressed by:

$$SNR = \sum_{k=1}^{K} \sum_{m=1}^{M} p_{k,m} \|f_m * \tilde{h}_k\|^2 x_{km}/\sigma_k^2 \qquad (1')$$

Where, the channel vector $\tilde{h}_k$ may be obtained through channel estimation, $x_{km}$ represents an optimization variable, and takes values of $\{0, 1\}$. In a case of $x_{km}=1$, it is indicated that the m-th sub-carrier is allocated to the k-th user equipment, and in a case of $x_{km}=0$, it is indicated that the m-th sub-carrier is not allocated to the k-th user equipment.

Equation (1') represents an optimization model to be solved. In this model, SNR maximization is taken as an optimization target, a case that each of the user equipment uses D sub-carriers is taken as a first set of constraint conditions, and a case that each of the sub-carriers is prevented from being overloaded and it is ensured that each of the sub-carriers carries a uniform number of user equipment is taken as a second set of constraint conditions, so as to solve the optimization problem, such that a parameter $x_{km}$ indicating whether the k-th user equipment uses the m-th sub-carrier is obtained. In this way, the result of the sub-carrier allocation for each of the user equipment is obtained.

The first set of constraint conditions may be expressed by the following equation (2'):

$$\sum_{m=1}^{M} x_{km} = D, k = 1, 2, \ldots, K \qquad (2')$$

The second set of constraint conditions may be expressed by the following equation (3'):

$$\sum_{k=1}^{K} x_{km} \in \left\{ \left\lfloor \frac{KD}{M} \right\rfloor, \left\lfloor \frac{KD}{M} \right\rfloor + 1 \right\}, \ m = 1, 2, \ldots, M \qquad (3')$$

where, $$\left\lfloor \frac{KD}{M} \right\rfloor$$

represents an integer part of $$\frac{KD}{M}.$$

It is to be understood that the above is only an example of the optimization model, and the present disclosure is not limited thereto. In addition, the present disclosure is also not limited to a case of using SNR as an indication of the channel quality.

As shown in a dashed line block in FIG. 1, the apparatus 100 may further include a transceiving unit 103, configured to transmit a result of the sub-carrier allocation to the user equipment. Then, the user equipment may transmit data using the sub-carriers allocated to the user equipment.

In addition, the transceiving unit 103 may further be configured to transmit, in response to a data transmission request of the user equipment, information of data packet length and sub-carrier parameter setting to the user equipment. The sub-carrier parameter setting includes, for example, parameters such as a center frequency, a bandwidth and the number of the sub-carriers. The user equipment may perform data packetting and sub-carrier waveform design based on the information, and then transmit data such as a quality of service requirement and a training sequence.

Correspondingly, the transceiving unit 103 may further be configured to receive the quality of service requirement and the training sequence from the user equipment. The base station performs channel estimation using the training sequence to obtain the channel vector $\tilde{h}_k$. In addition, although not shown in FIG. 1 the apparatus 100 may further include a channel estimating unit configured to perform channel estimation based on the training sequence.

Figure 3:
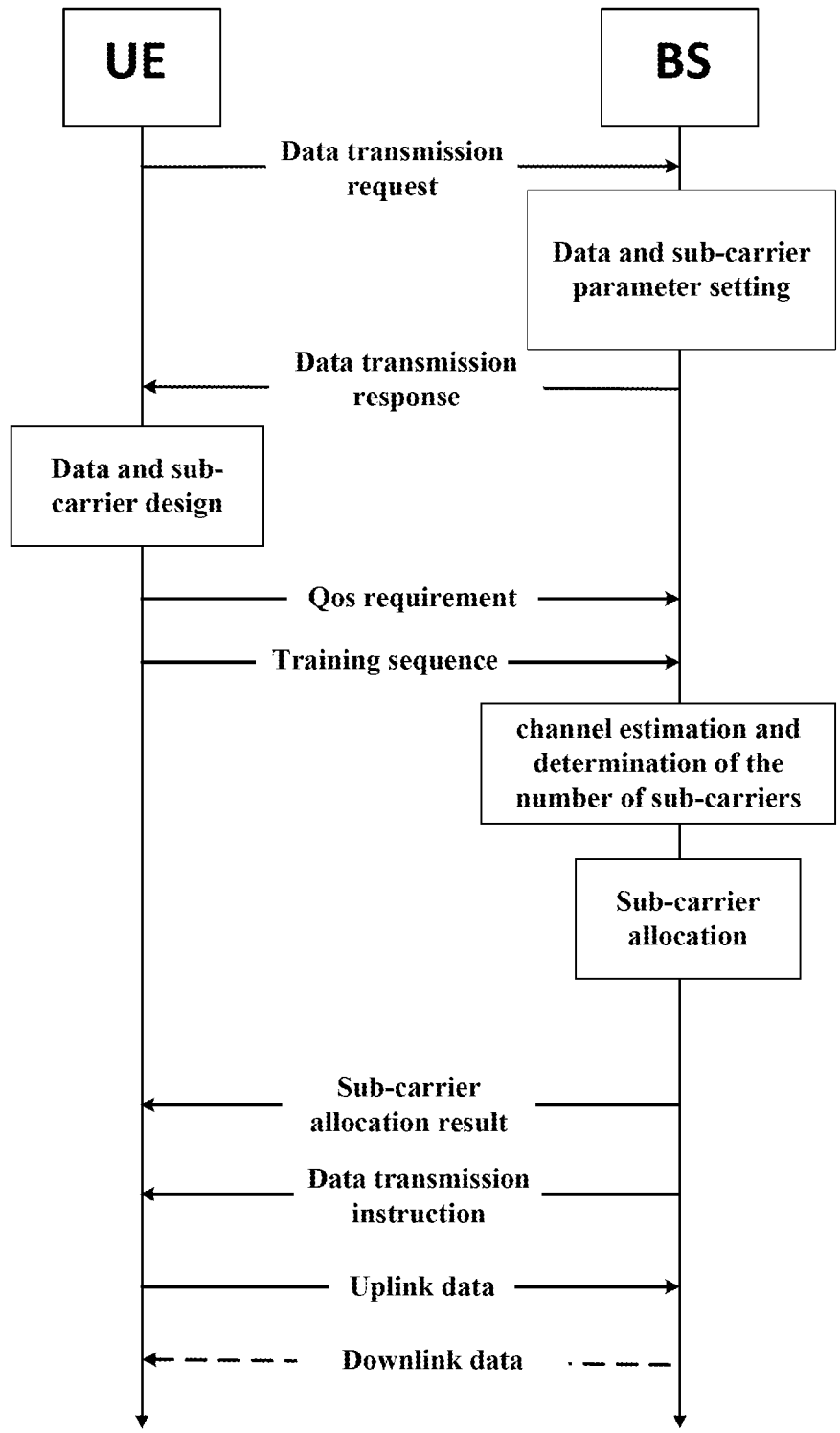
FIG. 3 is a diagram of an example of an information procedure between a base station and user equipment in a HMA wireless communication system according to an embodiment of the present disclosure.

For ease of understanding, FIG. 3 shows an example of an information procedure between a base station (BS) and user equipment (UE) in a HMA wireless communication system. In the example, description is made by taking a time division duplex uplink data transmission system as an example.

The UE first transmits a data transmission request to the BS. Upon receiving the data transmission request, the BS detects whether a surrounding environment is suitable for communication. If the surrounding environment is suitable for communication, the BS generates a data packet length and sub-carrier parameter setting (which is used for sub-carrier design) in response to the data transmission request, and transmits the settings to the UE in the data transmitting response. The UE performs data packetting and sub-carrier design based on the received data packet length and sub-carrier parameter setting. The manner of the data packet and the manner of sub-carrier design are agreed by both the UE and the BS.

Subsequently, the UE transmits a quality of service (QoS) requirement and a training sequence to the BS. The BS performs channel estimation based on the received training sequence, and determines, based on the result of the channel estimation, the QoS and the number of active users, the number of sub-carriers allocated to each of the user equipment. Next, the base station performs the above mentioned sub-carrier allocation method to obtain the result of the sub-carrier allocation for each of the user equipment, and transmits the result and the data transmission instruction to the UE. Upon receiving the data transmission instruction, the UE transmits the uplink data using the allocated sub-carriers based on the above-described data packet length and sub-carrier parameter setting. In addition, the BS receives the data using a corresponding receiving method, and performs, if necessary, downlink data transmission.

In the above signaling interaction process, most of the signaling data only involves a small amount of data which may be transmitted through a control channel. The training sequence and the data block involve a relative large amount of data and are transmitted through a data channel.

In this embodiment, the apparatus 100 optimizes the sub-carrier allocation with a target of optimizing the overall communication quality of the HMA communication system, such that at least one of the following advantages can be obtained: the system performance is improved, the utilization rate of spectrum resources of the system is improved and load balancing among sub-carriers is achieved.

Second Embodiment

Figure 4:
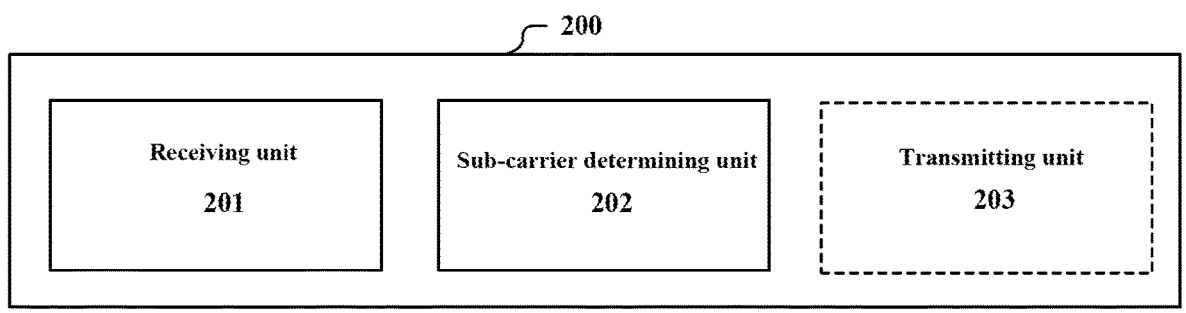
FIG. 4 is a block diagram of a structure of an apparatus for a HMA wireless communication system according to an embodiment of the present disclosure.

FIG. 4 is a block diagram of a structure of an apparatus 200 for a HMA wireless communication system according to an embodiment of the present disclosure. The apparatus 200 includes: a receiving unit 201, configured to receive information of sub-carrier allocation from a base station; and a sub-carrier determining unit 202, configured to determine sub-carriers to be used based on the received information.

The apparatus 200 may be located, for example, in the user equipment. For example, the apparatus 200 may be implemented as a mobile terminal (such as a smart phone, a tablet personal computer (PC), a notebook PC, a portable game terminal, a portable/dongle type mobile router and a digital camera), or a vehicle-mounted terminal (such as a car navigation device). The apparatus 200 may also be implemented as a terminal (which is also referred to as a machine type communication (MTC) terminal) performing machine-to-machine (M2M) communication. In addition, the apparatus 200 may be a wireless communication module (such as an integrated circuit module including a single wafer) mounted on each of the above-described terminals.

In an example, the receiving unit 201 may further be configured to receive information of a data packet length and sub-carrier parameter setting from the base station for use in data packetting and filter generation.

In addition, as shown in a dashed line block in FIG. 4, the apparatus 200 may further include: a transmitting unit 203, configured to transmit QoS and training sequence to the base station, for use by the base station in the sub-carrier allocation. For example, as described above with reference to FIG. 3, the base station performs channel estimation using the training sequence, and determines a sub-carrier allocation scheme based on the result of channel estimation, the QoS and the like.

In this embodiment, the apparatus 200 performs data communication using the sub-carriers allocated by the base station, such that at least one of the following advantages can be achieved: the system performance is improved, the utilization rate of spectrum resources of the system is improved and load balancing among sub-carriers is achieved.

Third Embodiment

Figure 5:
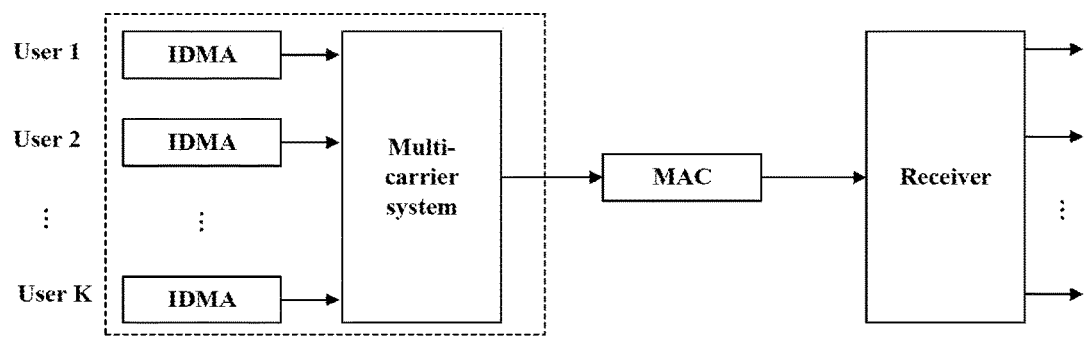
FIG. 5 is a schematic diagram of a structure of a FBMC-IDMA communication system adopting an apparatus 100 in FIG. 1.

FIG. 5 is a schematic structural diagram of a HMA communication system adopting the apparatus 100 according to the first embodiment. In FIG. 5, IDMA represents a multiple access layer and the multi-carrier system represents a multi-carrier layer. The parts in a dashed line block represent a transmitter. The K user equipment use the transmitter to transmit data. The data is processed through the IDMA layer and the multi-carrier system and is transmitted to the multiple access channel (MAC) for transmission. Then, the data is received by a corresponding receiver and data of each of the user equipment is recovered therefrom. In the processing of the multi-carrier system, each of the user equipment may generate, based on the sub-carrier allocation scheme determined by the apparatus 100, transmission data using the corresponding sub-carriers.

The multi-carrier layer processing may be, for example, filter bank multi-carrier (FBMC) processing or OFDM processing. The FBMC-IDMA communication system may be divided into a non-cyclic prefix FBMC-IDMA (NCP FBMC-IDMA) communication system and a cyclic prefix FBMC-IDMA (CP FBMC-IDMA) communication system.

Figure 6:
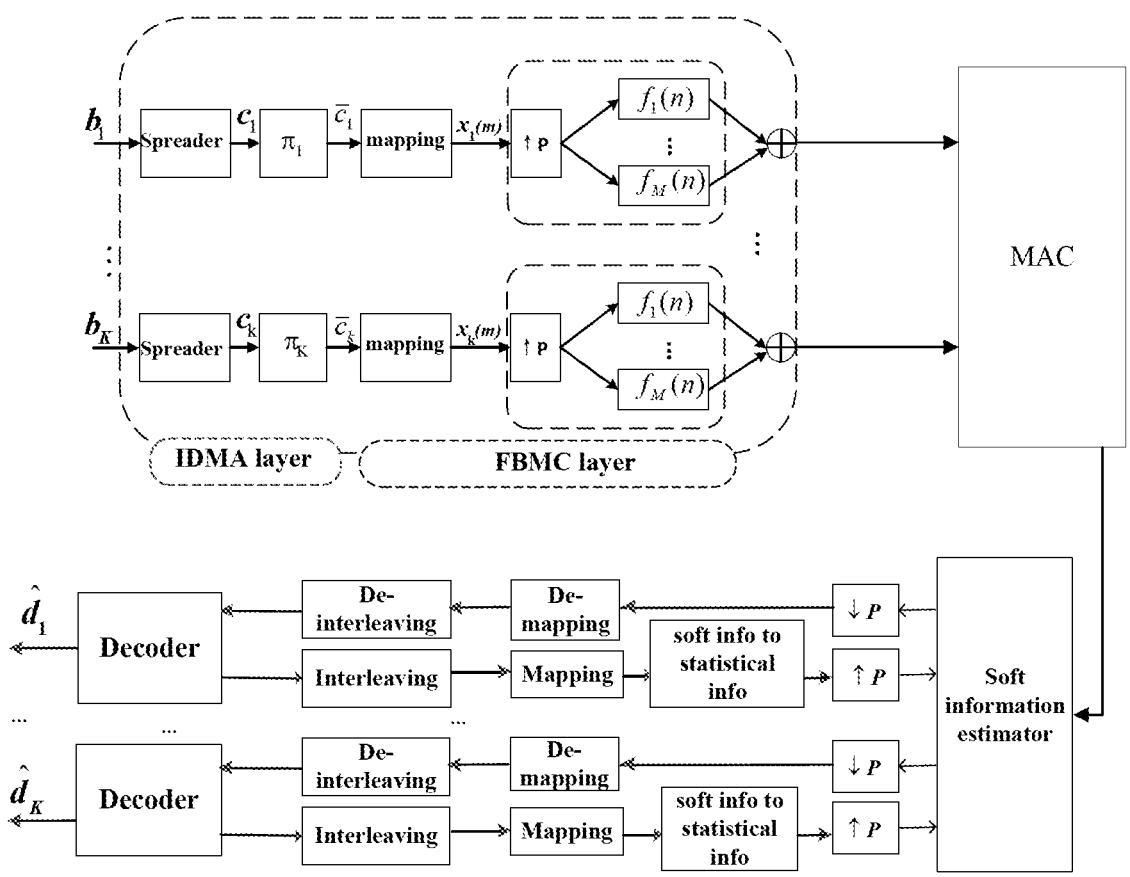
FIG. 6 is a block diagram of structure of a non-cyclic prefix filter bank multiple carrier-interleave division multiple access (NCP FBMC-IDMA) communication system.

FIG. 6 is a block diagram of a structure of the NCP FBMC-IDMA communication system. At the transmitting end, interleave division multiple access processing and filter bank multi-carrier processing are respectively performed for K user equipment, and the processing of data for each of the user equipment is described by taking a user k as an example. A bit vector $b_k$ (either encoded or un-encoded) of the transmission information of the user k may be input to a spreader to be spread, so as to obtain a spread chip vector $c_k$. The spreading sequence is, for example, an alternating sequence of $\{+1, -1\}$. Then, $c_k$ is interleaved through an interleaver 1a to obtain an interleaved chip vector $\bar{c}_k$. The interleavers of the K users must be different from each other to facilitate the system to distinguish the users. Next, after the symbol mapping is performed on $\bar{c}_k$, a data stream $x_k(m)$, k=1, 2, ... K is obtained. The symbol mapping here may be BPSK, QPSK, QAM and the like. Up-sampling with a sampling factor of P is performed for each data stream. Then, the data stream enters one or more pre-selected filters for synchronous filtering, and outputs of the one or more filters are combined to obtain output data of each of the users. Finally, the output data of the K users enters the multiple access channel (MAC) for transmission to the receiving end.

At the receiving end, a chip-by-chip detecting algorithm may be used. After the transmission through the MAC channel, the received signal r may be expressed by:

$$r = \sum_{k=1}^{K} H_k \tilde{x}_k + \xi, \quad (1)$$

-continued where, $$r = [r(1), r(2), \ldots , r(N)]^T \quad (2)$$

$$\tilde{x}_k = [\tilde{x}_k(1), \tilde{x}_k(2), \ldots , \tilde{x}_k(N)]^T \quad (3)$$

$$\xi = [\xi(1), \xi(2), \ldots , \xi(N)]^T \quad (4)$$

$$H_k = \begin{bmatrix} h_{eq,k}(1) & 0 & \ldots & 0 & 0 & \ldots & 0 \\ h_{eq,k}(2) & h_{eq,k}(1) & \ldots & 0 & & \ldots & 0 \\ \vdots & \vdots & \ddots & 0 & \vdots & \ddots & \vdots \\ h_{eq,k}(l) & h_{eq,k}(l-1) & \ldots & 0 & 0 & \ldots & 0 \\ \vdots & \vdots & \ddots & \ldots & \ldots & \ddots & \vdots \\ 0 & 0 & \ldots & h_{eq,k}(l) & h_{eq,k}(l-1) & \ldots & h_{eq,k}(1) \end{bmatrix} \quad (5)$$

Where N represents a length of a code chip, and is a natural number. r(j) represents each received symbol data, $\{\tilde{x}_k(j)\}$ represents up-sampled data of $\{x_k(m)\}$, $\xi(j)$ represents additive white Gaussian noise (AWGN), $h_{eq,k}(l)$ represents an equivalent channel obtained by synthesizing all the sub-carriers selected by the user k and the MAC of the user k, $H_k$ represents a Toeplitz matrix of N×N composed of $h_{eq,k}(l)$ as a first column, and a superscript T represents matrix transpose.

The equation (1) may be written as:

$$r = H_k \tilde{x}_k + \xi_k, \quad (6)$$

$$\xi_k \equiv r - H_k \tilde{x}_k = \sum_{k' \neq k} H_{k'} \tilde{x}_{k'} + \xi \quad (7)$$

Where, $\xi_k$ represents interferences (including noise, hereinafter referred to as sum of interference and noise) corresponding to the user k. According to the central limit theorem, may be approximated as a Gaussian variable. A probability density function (PDF) of the Gaussian variable is determined by its mean value and variance.

At the receiving end, a soft information estimator computes a mean value matrix and a covariance matrix of the sum of interference and noise based on the mean value and the variance of the code chip to obtain external soft information of the code chip. Specifically, the soft information estimator calculates the above external soft information as follows:

$$e_{ESE}(\tilde{x}_k) = 2H_k^H (Cov(\xi_k))^{-1}(r - E(\xi_k)) \quad (8)$$

Where $e_{ESE}(\tilde{x}_k)$ represents the obtained external soft information, and, $$E(\xi_k) = E(r) - H_k E(\tilde{x}_k) \quad (9)$$

$$Cov(\xi_k) = Cov(r) - H_k Cov(\tilde{x}_k) H_k^H \quad (10)$$

Where, Cov(r) represents a covariance matrix of the received data, the superscript H represents a conjugate transpose operation, $Cov(\xi_k)$ represents a covariance matrix of the sum of interference and noise of the user k, and the superscript −1 represents a matrix inverse operation. $E(\tilde{x}_k)$ represents a mean value of the vector $\tilde{x}_k$ and is a chip mean vector composed of the mean values of the chip. $Cov(\tilde{x}_k)$ represents the covariance matrix of the vector $\tilde{x}_k$ and represents a covariance matrix of the code chip composed by taking variance of the code chip as a diagonal element. $E(\tilde{x}_k)$ and $Cov(\tilde{x}_k)$ may be respectively calculated by the following equations (11) and (12):

$$E(\tilde{x}_k) = [E(\tilde{x}_k(1)), E(\tilde{x}_k(2)), \ldots , E(\tilde{x}_k(N))]^T \quad (11)$$

$$Cov(\tilde{x}_k) = \operatorname{diag}\{Var(\tilde{x}_k(1)), Var(\tilde{x}_k(2)), \ldots , Var(\tilde{x}_k(N))\} \quad (12)$$

where, $E(\tilde{x}_k(j))$ and $Var(\tilde{x}_k(j))$ respectively represent the mean value and the variance of the chip, which may be obtained by performing up-sampling on the mean value and the variance of the data stream $x_k(m)$ as follows:

$$E(\tilde{x}_k(j)) = (E(x_k(m)))_{\uparrow P} \quad (13)$$

$$Var(\tilde{x}_k(j)) = (Var(x_k(m)))_{\uparrow P} \quad (14)$$

Where, $\uparrow P$ represents the up-sampling with an up-sampling factor of P. For example, the mean value and the variance of the data stream may be calculated based on a transformation from the soft information to the statistical information according to the following formula:

$$E(x_k(m)) = \operatorname{Re}(E(x_k(m))) + j\operatorname{Im}(E(x_k(m))) \quad (15)$$
$$= E(\operatorname{Re}(x_k(m))) + jE(\operatorname{Im}(x_k(m)))$$

where, $$E(\operatorname{Re}(x_k(m))) = \tanh(e_{DEC}(\operatorname{Re}(x_k(m)))/2) \quad (16)$$

$$E(\operatorname{Im}(x_k(m))) = \tanh(e_{DEC}(\operatorname{Im}(x_k(m)))/2)$$

$$Var(x_k(m)) = \operatorname{Re}(Var(x_k(m))) + j\operatorname{Im}(Var(x_k(m)))$$
$$= Var(\operatorname{Re}(x_k(m))) + jVar(\operatorname{Im}(x_k(m)))$$

where, $$Var(\operatorname{Re}(x_k(m))) = 1 - (E(\operatorname{Re}(x_k(m))))^2$$

$$Var(\operatorname{Im}(x_k(m))) = 1 - (E(\operatorname{Im}(x_k(m))))^2$$

In the above equation, $x_k(m)$ represents a data stream of the k-th user. E( ) represents the mean value, Var( ) represents the variance, Re represents a real part, Im represents an imaginary part, $e_{DEC}(\operatorname{Re}(x_k(m)))$ represents apriori soft information of the real part of the data stream, $e_{DEC}(\operatorname{Im}(x_k(m)))$ represents apriori soft information of the imaginary part of the data stream. In an initial iteration, the apriori soft information is set to 0. That is, the mean value and the variance of the data stream are obtained based on the apriori soft information of the data stream.

Subsequently, down-sampling is performed on the external soft information $e_{ESE}(\tilde{x}_k)$ to obtain a second external soft information $e_{ESE}(x_k(m))$ of the data stream, then de-mapping, de-interleaving and decoding are performed for the user using the second external soft information to obtain third external soft information. Corresponding interleaving and mapping are performed using the third external soft information to obtain updated apriori soft information $e_{DEC}(x_k(m))$. Next, updated apriori statistic information of the data stream is calculated based on the updated apriori soft information according to the above equations (15) and (16), and up-sampling is performed according to the equations (13) and (14) to obtain updated apriori statistic information of the chip. Further, the soft information estimator calculates the updated external soft information according to the equations (8) to (12), thereby enabling a new round of iterative calculations.

In addition, although in the above example the down-sampling is performed on the external soft information of the chip after the external soft information is calculated, the down-sampling may also be performed on the mean value $E(\xi_k)$ and the covariance matrix $Cov(\xi_k)$ of the sum of interference and noise, thereby directly calculating the second external soft information $e_{ESE}(x_k(m))$ of the data stream according to equation (8). It should be understood that the calculation results obtained by the two methods are the same, except that the amount of calculation is slightly different.

At the receiving end, iterative control is performed so that the above calculation is repeated until a predetermined condition is satisfied. The predetermined condition may be, for example, a condition that a predetermined number of iterations are achieved. In a case where the predetermined condition is satisfied, hard-decision is performed on an output of a decoder at this time to obtain an estimation value $\hat{d}_k$.

Figure 7:
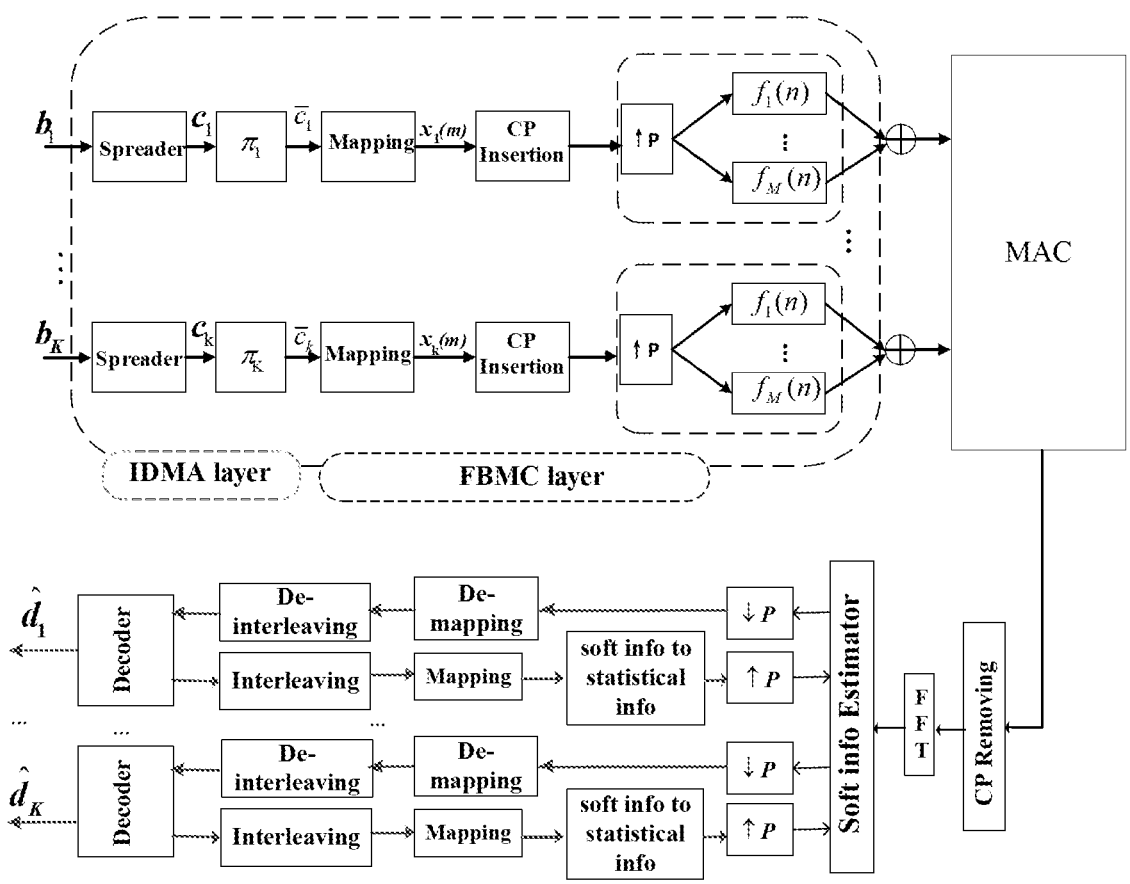
FIG. 7 is a block diagram of structure of a cyclic prefix filter bank multiple carrier-interleave division multiple access (CP FBMC-IDMA) communication system.

FIG. 7 is a block diagram of a structure of a CP FBMC-IDMA communication system. At a transmitting end, in addition to the processing in FIG. 6, a cyclic prefix (CP) is inserted in the interleaved information before the up-sampling is performed. For example, the insertion of the CP facilitates improvement of the communication quality, and thus it can be applied to a case where the channel quality is poor. The other processing is similar to the processing of NCP FBMC-IDMA, and the description is not repeated here. Finally, output data of the K users enters the multiple access channel (MAC) for transmission to the receiving end.

Similarly, at the receiving end, a chip-by-chip detecting algorithm may be used. After the transmission through the MAC channel, the received signal r may be expressed by:

$$r = \sum_{k=1}^{K} H_k \tilde{x}_k + \xi, \qquad (17)$$

where, $$r = [r(1), r(2), \ldots, r(N)]^T \qquad (18)$$

$$\tilde{x}_k = [\tilde{x}_k(1), \tilde{x}_k(2), \ldots, \tilde{x}_k(N)]^T \qquad (19)$$

$$\xi = [\xi(1), \xi(2), \ldots, \xi(N)]^T \qquad (20)$$

$$H_k = \begin{bmatrix} h_{eq,k}(1) & 0 & \ldots & 0 & h_{eq,k}(l) & \ldots & h_{eq,k}(2) \\ h_{eq,k}(2) & h_{eq,k}(1) & \ldots & 0 & & \ldots & h_{eq,k}(3) \\ \vdots & \vdots & \ddots & 0 & \vdots & \ddots & \vdots \\ h_{eq,k}(l) & h_{eq,k}(l-1) & \ldots & 0 & 0 & \ldots & 0 \\ \vdots & \vdots & \ddots & \ldots & \ldots & \ddots & \vdots \\ 0 & 0 & \ldots & h_{eq,k}(l) & h_{eq,k}(l-1) & \ldots & h_{eq,k}(1) \end{bmatrix} \qquad (21)$$

Where, similarly, $r(j)$ represents each received symbol data, $\tilde{x}_k(j)$ represents up-sampled data of $x_k(m)$, and $x_k(m)$ represents data before the transmitting terminal adds the CP, $\xi(j)$ represents the additive white Gaussian noise (AWGN); $h_{eq,k}(l)$ represents an equivalent channel obtained by combining the user k and the MAC of the user, $H_k$ represents a cyclic matrix of N×N composed of $h_{eq,k}(l)$ as a first column. It can be seen that $H_k$ is different from that in the case of NCP FBMC-IDMA.

A Fast Fourier Transform (FFT) is performed on the equation (17) to obtain the following equation (22).

$$R = \sum_{k=1}^{K} \Lambda_k X_k + Z, \qquad (22)$$

Where, R, $X_k$ and Z respectively represent frequency domain signals of r, $\tilde{x}_k$ and $\xi$ after the FFT operation, $\Lambda_k$=diag$\{\lambda_k(1), \lambda_k(2), \ldots, \lambda_k(N)\}$, $\Lambda_k$ represents a diagonal matrix composed of $\{\lambda_k(1), \lambda_k(2), \ldots, \lambda_k(N)\}$ as the elements on the diagonals of the matrix, and $\{\lambda_k(1), \lambda_k(2), \ldots, \lambda_k(N)\}$ represents the value of $h_{eq,k}(l)$ after a N point FFT.

For each row of equation (22), there is the following formula (23).

$$R(n) = \sum_{k=1}^{K} \lambda_k(n) X_k(n) + Z(n), n = 1, 2, \ldots, N \qquad (23)$$

where, R(n), $\lambda_k(n)$, $X_k(n)$ and Z(n) respectively represent the n-th element of R, $\Lambda_k$, $X_k$ and Z.

The equation (23) may also be written as:

$$R(n) = \lambda_k(n) X_k(n) + \eta_k(n), \qquad (24)$$

$$\eta_k(n) \equiv R(n) - \lambda_k(n) X_k(n) = \sum_{k' \neq k} \lambda_{k'}(n) X_{k'}(n) + \eta(n) \qquad (25)$$

Where, $\eta_k(n)$ represents a sum of interference and noise corresponding to the user k. According to the central limit theorem, $\eta_k(n)$ may be approximated as a Gaussian variable. The probability density function (PDF) of the Gaussian variable is determined by a mean value and a variance of the Gaussian variable.

After CP removal and FFT operation are performed on the received data on a chip by chip basis, the received data is provided to the soft information estimator. The soft information estimator calculates the external soft information as follows: a mean value of the sum of interference and noise is calculated based on the mean value of the chip in a frequency domain to obtain an updated mean value of the chip in the frequency domain; an inverse Fourier transformation is performed on the updated mean value in the frequency domain by an inverse fast Fourier transform module to obtain a mean value of the chip in a time domain; and the external soft information is calculated using the mean value of the chip in the time domain.

For example, the soft information estimator may calculate the external soft information according to the following equation:

$$e_{ESE}(x_k(m)) = \ln\left(\frac{1 + E(x_k(m))}{1 - E(x_k(m))}\right) \qquad (26)$$

Where, $e_{ESE}(x_k(m))$ represents the obtained external soft information, $E(x_k(m))$ represents updated statistical information of the data stream calculated based on the received data and the apriori statistical information of the chip. The updating process is essentially performed in the frequency domain, which is expressed as follows.

$$E(x_k(m)) = (ifft(E(X_k(n))))_{\uparrow P} \qquad (27)$$

↑P represents down-sampling with a down-sampling factor of P.

$$E(X_k(n)) = \frac{E(R(n)) - E(\eta_k(n))}{\lambda_k(n)} \qquad (28)$$

Where, R(n) represents a transformed received data, $$E(\eta_k(n)) = \sum_{\substack{k'=1 \\ k' \neq k}}^{K} \lambda_{k'}(n) E(X_{k'}(n)) \quad (29)$$

$E(X_{k'}(n))$ represents the mean value of the chip in the frequency domain, where k' is only for distinguishing from k. $E(X_k(n))$ may be obtained by performing up-sampling and FFT operation on the men value of the data stream in the time domain. For the k-th user, the following equation is obtained.

$$E(X_k(n)) = fft((E(x_k(m)))_{\uparrow P} \quad (30)$$

For example, the mean value of the data stream in the time domain may be calculated according to the following equation:

$$\begin{aligned} E(x_k(m)) &= \text{Re}(E(x_k(m))) + j\text{Im}(E(x_k(m))) \\ &= E(\text{Re}(x_k(m))) + jE(\text{Im}(x_k(m))) \end{aligned} \quad (31)$$

Where, $$E(\text{Re}(x_k(m))) = \tanh(e_{DEC}(\text{Re}(x_k(m)))/2)$$

$$E(\text{Im}(x_k(m))) = \tanh(e_{DEC}(\text{Im}(x_k(m)))/2)$$

In the above equation, $x_k(m)$ represents a data stream of the k-th user, E( ) represents the mean value, Re represents a real part, Im represents an imaginary part, $e_{DEC}(\text{Re}(x_k(m)))$ represents apriori soft information of the real part of the data stream, and $e_{DEC}(\text{Im}(x_k(m)))$ represents apriori soft information of the imaginary part of the data stream. Similarly, in a first iteration, the initial value of the apriori soft information is set to zero.

In the above equation (26), the external soft information of the data stream is directly calculated. This is because, the down-sampling is performed when the updated statistical information is calculated in equation (27), but the process may also be strictly as shown in the structure in FIG. 12, that is, the down-sampling is not performed in equation (27), instead, the down-sampling is performed after the conversion to the external soft information. In this case, this may be shown by the following equations (32) and (33).

$$E(\tilde{x}_k(j)) = ifft(E(X_k(n))) \quad (32)$$

$$e_{ESE}(x_k(m)) = \left(\ln\left(\frac{1 + E(\tilde{x}_k(j))}{1 - E(\tilde{x}_k(j))}\right)\right)_{\downarrow P} \quad (33)$$

It should be understood that the results obtained through the two methods are the same, except that the amount of calculation is different.

After the second external soft information $e_{EsE}(x_k(m))$ (here, the term "second" is only used to distinguish from the external soft information of the chip and is kept consistent with that in the previous example) of the data stream is obtained as described above, de-mapping, de-interleaving and decoding are performed for the user using the second external soft information to obtain third external soft information. Corresponding interleaving and mapping are performed using the third external soft information to obtain updated apriori soft information $e_{DEC}(x_k(m))$. Next, the updated apriori statistic information of the data stream is calculated according to equation (31), and updated apriori statistic information of the chip in the frequency domain is obtained according to equation (30). Then, the updated external soft information of the data stream in the time domain is calculated according to equations (26) to (29), thereby enabling a new round of iterative calculations.

Similarly, iterative control is performed at the receiving end such that the above calculation is repeated until a predetermined condition is satisfied. The predetermined condition may be, for example, a condition that a predetermined number of iterations are achieved. In a case where the predetermined condition is satisfied, hard-decision may be performed on an output of a decoder to obtain an estimation value $\hat{d}_k$.

Figure 8:
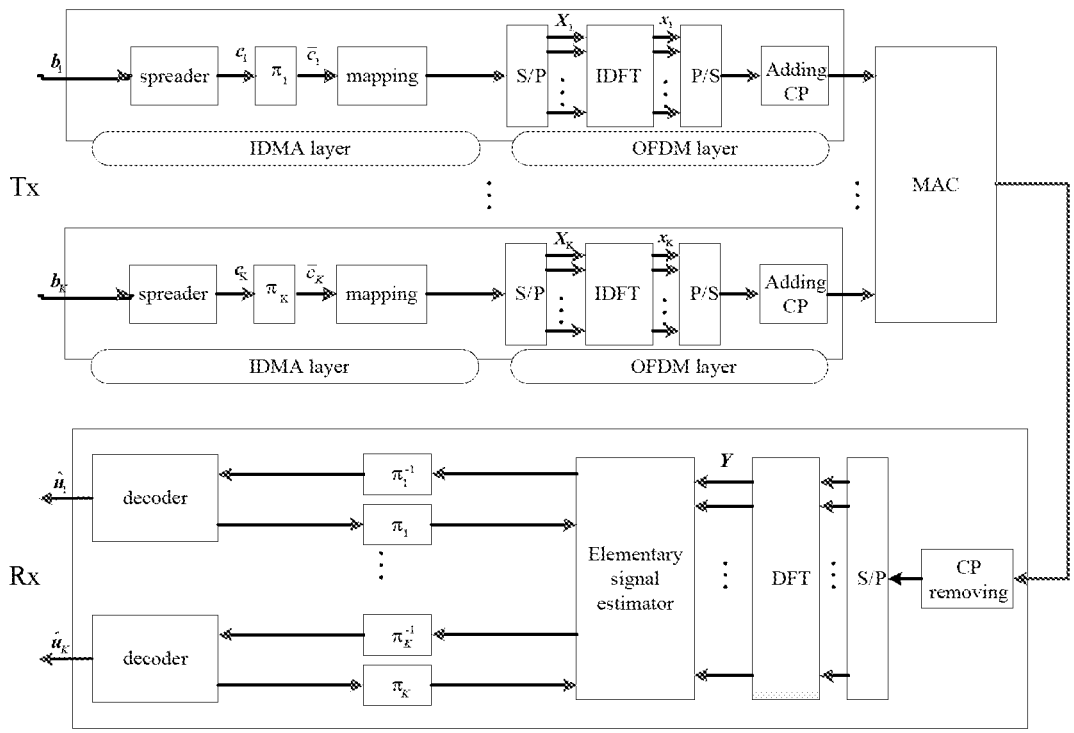
FIG. 8 is a block diagram of a structure of an OFDM-IDMA communication system.

FIG. 8 is a block diagram of a structure of an OFDM-IDMA communication system. At a transmitting end (Tx), a bit vector (either encoded or un-encoded) of transmission information of the user k may be input to a spreader to be spread, so as to obtain an spread chip vector $c_k$. The spreading sequence is, for example, an alternating sequence of $\{+1, -1\}$. Then, $c_k$ is interleaved through an interleaver $\pi_k$ to obtain an interleaved chip vector $\bar{c}_k$. Here, the interleavers of the K users must also be different from each other to facilitate the system to distinguish the users. Next, after symbol mapping is performed on $\bar{c}_k$, data stream $x_k(m)$, k=1, 2, ..., K may be obtained. Subsequently, a serial/parallel (S/P) conversion is performed on the data stream for performing inverse discrete Fourier transform (IDFT), and parallel/serial (P/S) conversion is performed on the transformed data. Then, a cyclic prefix (CP) is added to obtain the transmitting data. The transmitting data is transmitted through MAC to the receiving end. At the receiving end, CP removal is performed first, then S/P conversion and DFT are performed. Finally, the external soft information is estimated using an elementary signal estimator, and decoding is performed based on the external soft information.

In the following, system bit error rates (BERs) in cases of adopting the random sub-carrier allocation scheme and adopting the sub-carrier allocation scheme implemented by the apparatus 100 described in the first embodiment are compared respectively for the above NCP FBMC-IDMA communication system, CP FBMC-IDMA and OFDM-IDMA communication system. In the calculation for the two allocation schemes, the parameters and algorithms used by the transmitter and the receiver are the same except that the sub-carriers are selected in different manners. Therefore, the obtained results can reflect the influence of the two sub-carrier allocation schemes on system performance.

Figure 9:
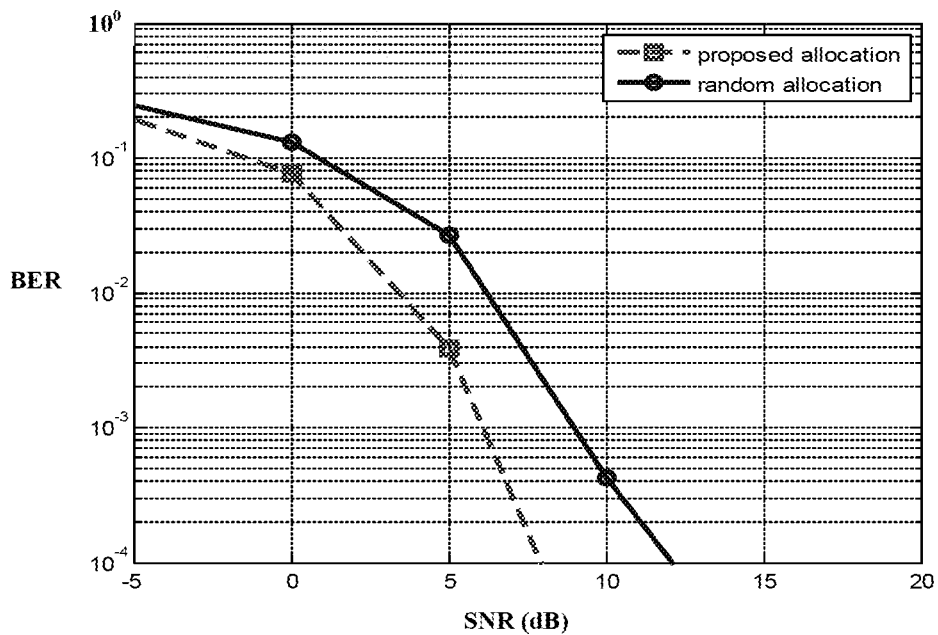
FIG. 9 is a graph showing a comparison between system bit error rates (BER) obtained by using the proposed sub-carrier allocation scheme in the present disclosure and a random sub-carrier allocation scheme in a NCP FBMC-IDMA communication system.

FIG. 9 is a graph showing a comparison between system BERs obtained by using the above two sub-carrier allocation schemes in the NCP FBMC-IDMA communication system. As an example, the following system-related parameters are adopted: a spread length of the spreader at the transmitting end is S=4, the number of active users is K=16, a length of the data block is N=128. The filter design used by the filter bank is incompletely reconstructed. A sampling rate of the filter bank is P=8, the number of sub-carriers of the filter bank is M=8, a length of a filter in the filter bank is $N_f$=64 Each of the user equipment uses a random interleaver, each of the user equipment selects D=3 sub-carriers, and each of the user equipment has a uniform power on each of the sub-carriers. That is, $p_{k,m}$ represents the same constant. The constellation diagram is QPSK modulation, the channel is a 16-tap Rayleigh fading channel, a CP length is $N_c = \lceil (N_f + L - 1)/P \rceil = 10$, and the number of iterations of the receiver is 12.

It can be seen from FIG. 9 that the BER performance obtained by using the sub-carrier allocation scheme of the present disclosure is superior to the BER performance obtained by using the random sub-carrier allocation scheme. At a high signal-to-noise ratio, a signal-to-noise ratio gain of about 3 dB can be achieved. Meanwhile, compared with the NCP FBMC-IDMA communication system using all the sub-carriers, only a bandwidth of D/M=3/8 is required and the spectrum utilization rate is increased by 8/3 times.

Figure 10:
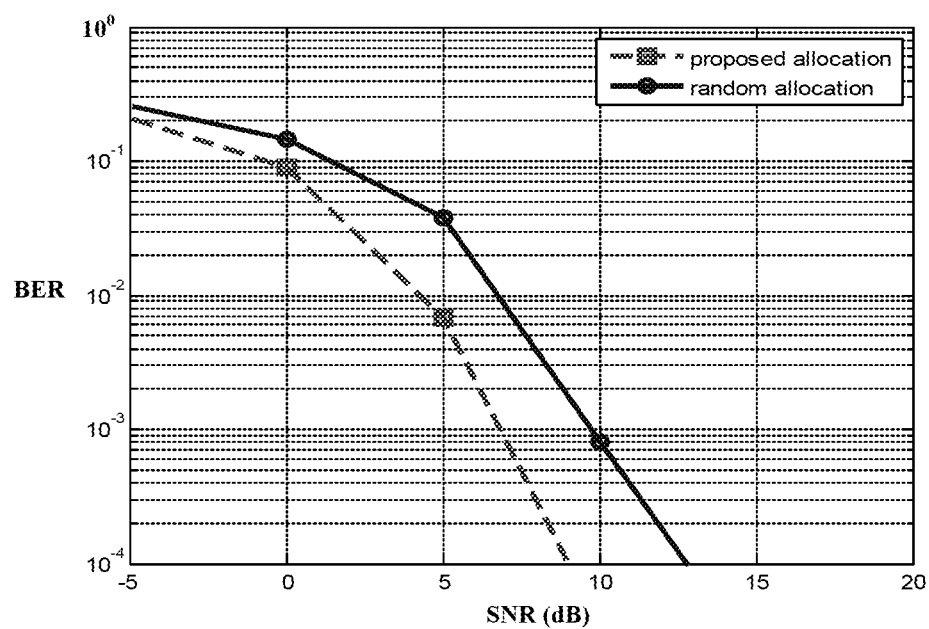
FIG. 10 is a graph showing a comparison between system BERs obtained by using the proposed sub-carrier allocation scheme in the present disclosure and a random sub-carrier allocation scheme in a CP FBMC-IDMA communication system.

FIG. 10 is a graph showing a comparison between the system BERs obtained by using the above two sub-carrier allocation schemes in the CP FBMC-IDMA communication system. Except for using the cyclic prefix, the system-related parameters are exactly the same as those in the NCP FBMC-IDMA communication system.

It can be seen from FIG. 10 that the BER performance obtained by using the sub-carrier allocation scheme of the present disclosure is superior to the BER performance obtained by using the random sub-carrier allocation scheme. At a high signal-to-noise ratio, a signal-to-noise ratio gain of about 3 dB can be achieved. Meanwhile, compared with the CP FBMC-IDMA communication system using all the sub-carriers, only a bandwidth of D/M=3/8 is required and the spectrum utilization rate is increased by 8/3 times.

Figure 11:
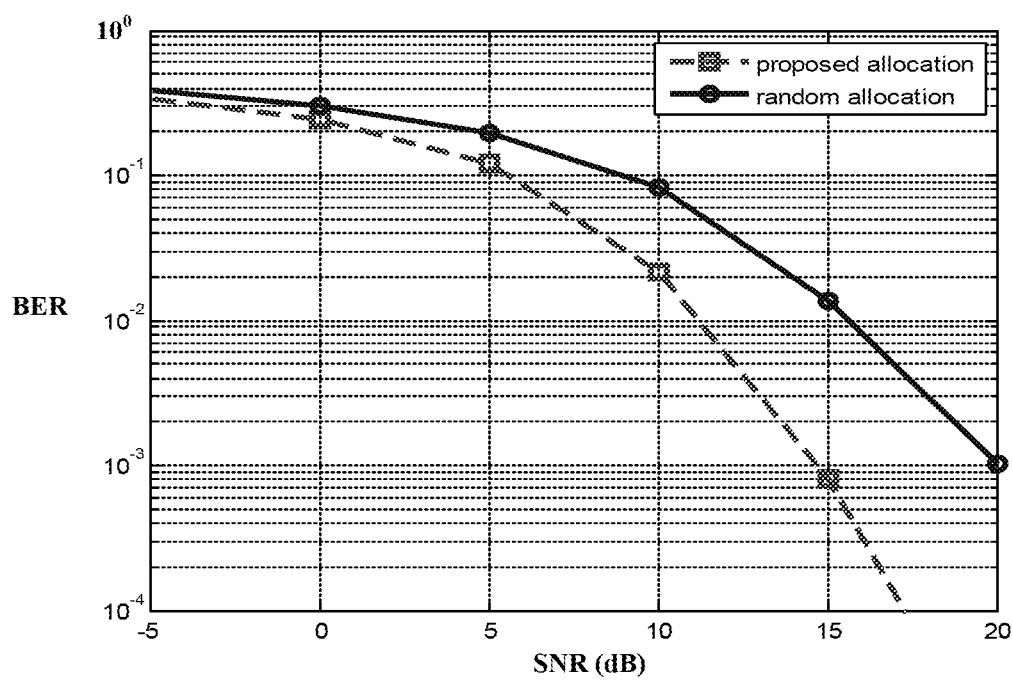
FIG. 11 is a graph showing a comparison between system BERs obtained by using the proposed sub-carrier allocation scheme in the present disclosure and a random sub-carrier allocation scheme in an OFDM-IDMA communication system.

FIG. 11 is a graph showing a comparison between system BERs obtained by using the above two sub-carrier allocation schemes in an OFDM-IDMA communication system. The system-related parameters are set as follows: a spread length S=32 the number of active users a length of the data block N=128, and the number of sub-carriers M=8. Each of the user equipment uses a random interleaver. Each of the users selects D=3 sub-carriers, and each of the user equipment has a uniform power on each of the sub-carriers. That is, $p_{k,m}$ is the same constant. The constellation map is QPSK modulation, the channel is a 16-tap Rayleigh fading channel, and the number of iterations of the receiver is 12. It can be seen from FIG. 11 that the BER performance obtained by using the sub-carrier allocation scheme of the present disclosure is superior to the BER performance obtained by using the random sub-carrier allocation scheme. At a high signal-to-noise ratio, a signal-to-noise ratio gain of about 5 dB can be achieved. In this case, compared with the OFDM-IDMA communication system using all the sub-carriers, only a bandwidth of D/M=3/8 is required and the spectrum utilization rate is increased by 8/3 times.

Fourth Embodiment

In the process of describing the apparatus for a hybrid multiple access wireless communication system in the embodiments described above, obviously, some processing and methods are also disclosed. Hereinafter, an overview of the methods is given without repeating some details disclosed above. However, it should be noted that, although the methods are disclosed in a process of describing the apparatus for a hybrid multiple access wireless communication system, the methods do not certainly employ or are not certainly executed by the aforementioned components. For example, the embodiments of the above apparatus may be partially or completely implemented with hardware and/or firmware, the corresponding methods described below may be executed by a computer-executable program completely, although the hardware and/or firmware of the above apparatus can also be used in the methods.

Figure 12:
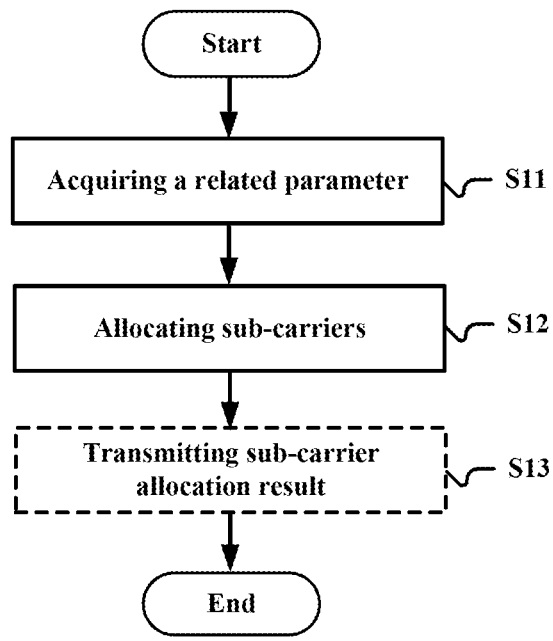
FIG. 12 is a flowchart of a method for a HMA wireless communication system according to an embodiment of the present disclosure.

FIG. 12 is a flowchart of a method for a hybrid multiple access wireless communication system according to an embodiment of the present disclosure. The method includes: acquiring a parameter related to the hybrid multiple access wireless communication system (S11); and allocating sub-carriers for each of user equipment using the related parameter with a target of optimizing an overall communication quality of the HMA wireless communication system (S12).

The hybrid multiple access wireless communication system may be a layered system in which the multi-carrier technology and the multiple access technology are combined. For example, the hybrid multiple access wireless communication system is a filter bank multi-carrier interleave division multiple access communication system.

The overall communication quality may be characterized by at least one of the following: a sum signal-to-noise ratio of all of the user equipment, channel capacity and an achievable rate.

In an example, the number of sub-carriers to be allocated to the user equipment and which sub-carriers are to be allocated are determined in step S12. For example, the sub-carrier allocation is performed further based on a condition that each of the sub-carriers carries a uniform number of user equipment. In this way, each of the sub-carriers may have a balanced load, thereby further improving system performance.

The related parameter acquired in step S11 may include at least a part of the following: the number K of active user equipment, the number M of all the sub-carriers, the number D of sub-carriers to be allocated to each of the user equipment, a channel vector $\tilde{h}_k$ corresponding to each of the user equipment k, a coefficient vector $f_m$ of the m-th sub-carrier, a power of the k-th user equipment on the m-th sub-carrier, and a noise power $\sigma_k^2$ of the k-th user equipment.

For example, in step S12, the sub-carrier allocation is optimized by taking a condition whether the k-th user equipment uses the m-th sub-carrier as an optimization variable with an optimization target of maximizing the sum signal-to-noise ratio of all the user equipment. The optimization is performed further with the following limitations: each of the user equipment uses D sub-carriers, and each of the sub-carriers carries a uniform number of user equipment.

In addition, in step 12, the number of the sub-carriers to be allocated to the user equipment may also be determined based on the channel vector $\tilde{h}_k$, a quality of service requirement of the user equipment and the number of the active user equipment.

As shown in a dashed line block in the figure, the above method may further include a step S13 of: transmitting a result of the sub-carrier allocation to the user equipment.

In addition, before step S11 is performed, information of a data packet length and sub-carrier parameter setting may be further transmitted to the user equipment in response to a data transmission request from the user equipment. In this way, the user equipment may perform data packetting and sub-carrier design based on the information. Subsequently, before step S11 is performed, the quality of service requirement and the training sequence may also be received from the user equipment, and channel estimation may be performed based on the training sequence to obtain a channel vector $\tilde{h}_k$.

Figure 13:
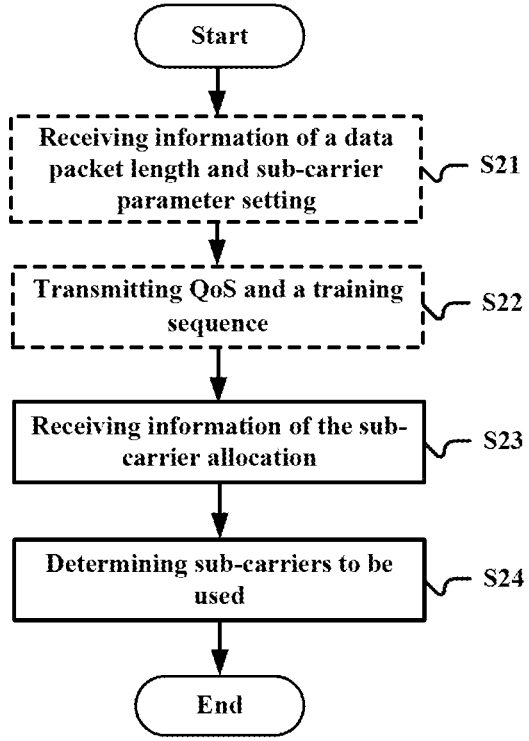
FIG. 13 is a flowchart of a method for a HMA wireless communication system according to an embodiment of the present disclosure.

FIG. 13 is a flowchart of a method for a hybrid multiple access wireless communication system according to an embodiment of the present disclosure. The method includes: receiving information of sub-carrier allocation from a base station (S23); and determining sub-carriers to be used based on the received information (S24).

In addition, as shown in a dashed line block in FIG. 13, the above method may further include: receiving information of a data packet length and sub-carrier parameter setting from the base station (S21), for use in data packetting and filter generation. After step S21, the method may further include: transmitting the quality of service requirement and the training sequence to the base station, for use by the base station in sub-carrier allocation.

It is to be noted that, the above methods can be used separately or in conjunction with each other. The details have been described in detail in the first to third embodiments, and are not repeatedly described here.

The basic principle of the present invention has been described above in conjunction with particular embodiments. However, as can be appreciated by those ordinarily skilled in the art, all or any of the steps or components of the method and device according to the invention can be implemented in hardware, firmware, software or a combination thereof in any computing device (including a processor, a storage medium, etc.) or a network of computing devices by those ordinarily skilled in the art in light of the disclosure of the invention and making use of their general circuit designing knowledge or general programming skills.

Those skilled in the art should understand that the parameter acquiring unit, the sub-carrier allocating unit, the channel estimating unit, the sub-carrier determining unit and the like in the apparatus described above may be implemented by one or more processors. The transceiving unit, the transmitting unit, the receiving unit and the like may be implemented by circuit components such as an antenna, a filter, a modem, a codec and the like.

Therefore, an electronic device (1) is further provided according to the present disclosure, which includes circuitry configured to: acquire a parameter related to the HMA wireless communication system; and allocate sub-carriers for each of user equipment using the related parameter with a target of optimizing an overall communication quality of the HMA wireless communication system.

An electronic device (2) is further provided according to the present disclosure, which includes circuitry configured to: receive information of sub-carrier allocation from a base station; and determine, based on the received information, sub-carriers to be used.

Moreover, the present invention further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present invention. The memory medium includes but is not limited to soft disc, optical disc, magnetic optical disc, memory card, memory stick and the like.

In the case where the present application is realized by software or firmware, a program constituting the software is installed in a computer with a dedicated hardware structure (e.g. the general computer 1400 shown in FIG. 14) from a storage medium or network, wherein the computer is capable of implementing various functions when installed with various programs.

Figure 14:
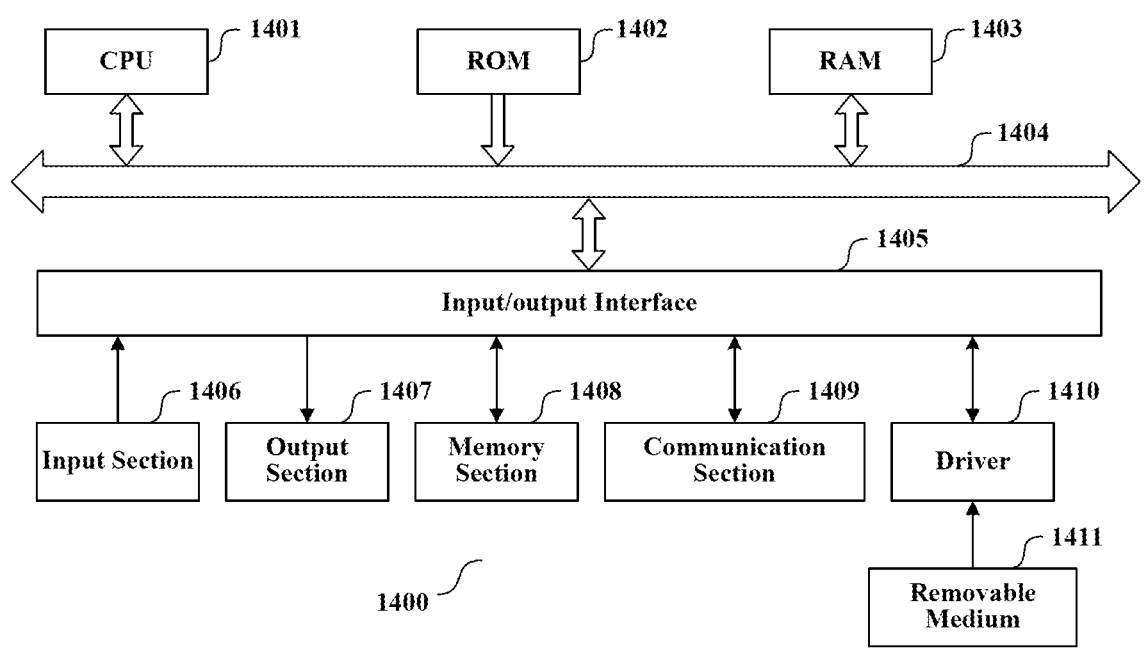
FIG. 14 is a block diagram of an exemplary block diagram illustrating the structure of a general purpose personal computer capable of realizing the method and/or device and/or system according to the embodiments of the present invention.

In FIG. 14, a central processing unit (CPU) 1401 executes various processing according to a program stored in a read-only memory (ROM) 1402 or a program loaded to a random access memory (RAM) 1403 from a memory section 1408. The data needed for the various processing of the CPU 1401 may be stored in the RAM 1403 as needed. The CPU 1401, the ROM 1402 and the RAM 1403 are linked with each other via a bus 1404. An input/output interface 1405 is also linked to the bus 1404.

The following components are linked to the input/output interface 1405: an input section 1406 (including keyboard, mouse and the like), an output section 1407 (including displays such as a cathode ray tube (CRT), a liquid crystal display (LCD), a loudspeaker and the like), a memory section 1408 (including hard disc and the like), and a communication section 1409 (including a network interface card such as a LAN card, a modem and the like). The communication section 1409 performs communication processing via a network such as the Internet. A driver 1410 may also be linked to the input/output interface 1405 if needed. If needed, a removable medium 1411, for example, a magnetic disc, an optical disc, a magnetic optical disc, a semiconductor memory and the like, may be installed in the driver 1410, so that the computer program read therefrom is installed in the memory section 1408 as appropriate.

In the case where the foregoing series of processing is achieved by software, programs forming the software are installed from a network such as the Internet or a memory medium such as the removable medium 1411

It should be appreciated by those skilled in the art that the memory medium is not limited to the removable medium 1411 shown in FIG. 14, which has program stored therein and is distributed separately from the apparatus so as to provide the programs to users. The removable medium 1411 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 1402 and the memory section 1408 in which programs are stored, and can be distributed to users along with the device in which they are incorporated.

To be further noted, in the apparatus, method and system according to the invention, the respective components or steps can be decomposed and/or recombined. These decompositions and/or recombinations shall be regarded as equivalent schemes of the invention. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n)" in which an element is defined will not preclude presence of an additional identical element(s) in a process, method, article or device comprising the defined element(s)" unless further defined.

Although the embodiments of the invention have been described above in detail in connection with the drawings, it shall be appreciated that the embodiments as described above are merely illustrative but not limitative of the invention. Those skilled in the art can make various modifications and variations to the above embodiments without departing from the spirit and scope of the invention. Therefore, the scope of the invention is defined merely by the appended claims and their equivalents.

The invention claimed is:

1. An apparatus for a hybrid multiple access wireless communication system, comprising:
   circuitry configured to
   acquire a parameter related to the hybrid multiple access wireless communication system;
   receive a quality of service requirement and a training sequence from each of a plurality of user equipment;
   perform channel estimation using the training sequence to obtain a channel vector, the channel vector being included in the related parameter;
   determine a number of sub-carriers to be allocated to each of the plurality of user equipment, based on a result of the channel estimation; and
   allocate the determined sub-carriers for each of user equipment of the plurality of user equipment using the related parameter with a target of optimizing an overall communication quality of the hybrid multiple access wireless communication system, the overall communication quality being determined based on a sun signal-to-noise ratio of all of the plurality of user equipment,
   wherein the circuitry is configured to optimize the sub-carrier allocation by taking a condition to maximize the sum signal-to-noise ratio of all of the plurality of user equipment.

2. The apparatus according to claim 1, wherein the overall communication quality is determined based on at least one of a channel capacity and an achievable rate, in addition to the sum signal-to-noise ratio of all of the plurality of user equipment.

3. The apparatus according to claim 1, wherein the circuitry is configured to perform the sub-carrier allocation further based on a condition that each of sub-carriers carries a uniform number of user equipment.

4. The apparatus according to claim 1, wherein the circuitry is configured to determine a number of sub-carriers to be allocated to the user equipment and which sub-carriers are to be allocated.

5. The apparatus according to claim 1, wherein the related parameter comprise at least one of a number of active user equipment of the plurality of user equipment which is defined as K, a number of all sub-carriers defined as M, a number of sub-carriers to be allocated to each of the user equipment of the plurality of user equipment which is defined as D, the channel vector corresponding to each of the k-th user equipment which is defined as $h_k$, a coefficient vector of the m-th sub-carrier which is defined as $f_m$, a power of the k-th user equipment on the m-th sub-carrier which is defined as $p_{k,m}$, and a noise power of the k-th user equipment which is defined as $\sigma_k^2$.

6. The apparatus according to claim 5, wherein the circuitry is configured to optimize the sub-carrier allocation by taking the condition whether the k-th user equipment is to use the m-th sub-carrier as an optimization variable, with an optimization target of maximizing the sum signal-to-noise ratio of all of the plurality of user equipment.

7. The apparatus according to claim 6, wherein the circuitry is configured to perform the optimization further with the following limitations: each of the user equipment of the plurality of user equipment uses D sub-carriers, and each of the sub-carriers carries a uniform number of user equipment.

8. The apparatus according to claim 5, wherein the circuitry is configured to determine the number of sub-carriers to be allocated to the user equipment, based on the channel vector $h_k$, the quality of service requirement of the user equipment, the number of the active user equipment.

9. The apparatus according to claim 1, wherein the circuitry is further configured to transmit a result of the sub-carrier allocation to the user equipment.

10. The apparatus according to claim 9, wherein the circuitry is further configured to transmit, in response to a data transmission request from the user equipment, information of a data packet length and sub-carrier parameter setting to the user equipment.

11. The apparatus according to claim 1, wherein the hybrid multiple access wireless communication system is a layered system combining a multi-carrier technology and a multiple access technology.

12. The apparatus according to claim 11, wherein the hybrid multiple access wireless communication system is a filter bank multi-carrier interleave division multiple access communication system.

13. An apparatus for a hybrid multiple access wireless communication system, comprising:
   circuitry configured to
   transmit a quality of service requirement and a training sequence to a base station;
   receive information of sub-carrier allocation from the base station, the information being set based on channel estimation performed by the base station to obtain a channel vector, the channel vector being included in the related parameter, and a number of sub-carriers to be allocated to the apparatus being determined based on a result of the channel estimation; and
   determine, based on the received information, the sub-carriers to be used, the sub-carriers being allocated by using a related parameter with a target of optimizing an overall communication quality of the hybrid multiple access wireless communication system, the overall communication quality being determined based on a sum signal-to-noise ratio of all of a plurality of user equipment, the sub-carrier allocation being optimized by taking a condition to maximize the sum signal-to-noise ratio of all of the plurality of user equipment.

14. The apparatus according to claim 13, wherein the circuitry is further configured to receive, from the base station, information of a data packet length and sub-carrier parameter setting, for use in data packetting and filter generation.

15. A method for a hybrid multiple access wireless communication system, comprising:
   acquiring a parameter related to the hybrid multiple access wireless communication system;
   receiving a quality of service requirement and a training sequence from each of a plurality of user equipment;
   performing channel estimation using the training sequence to obtain a channel vector, the channel vector being included in the related parameter;
   determining a number of sub-carriers to be allocated to each of the plurality of user equipment based on a result of the channel estimation; and
   allocating the determined sub-carriers for each of user equipment of the plurality of user equipment the related parameter with a target of optimizing an overall communication quality of the hybrid multiple access wireless communication system the overall communication quality being determined based on a sum signal-to-noise ratio of all of the plurality of user equipment, the sub-carrier allocation being optimized by taking a condition to maximize the sum signal-to-noise ratio of all of the plurality of user equipment.

16. A method for a hybrid multiple access wireless communication system, comprising:
- transmitting a quality of service requirement and a training sequence to a base station;
- receiving information of sub-carrier allocation from the base station, the information being set based on channel estimation performed by the base station to obtain a channel vector, the channel vector being included in the related parameter, and a number of sub-carriers to be allocated to the apparatus being determined based on a result of the channel estimation; and
- determining, based on the received information, the sub-carriers to be used, the sub-carriers being allocated by using a related parameter with a target of optimizing an overall communication quality of the hybrid multiple access wireless communication system, the overall communication quality being determined based on a sum signal-to-noise ratio of all of a plurality of user equipment, the sub-carrier allocation being optimized by taking a condition to maximize the sum signal-to-noise ratio of all of the plurality of user equipment.

* * * * *